US010785718B2

(12) United States Patent
Li et al.

(10) Patent No.: US 10,785,718 B2
(45) Date of Patent: Sep. 22, 2020

(54) SOFTWARE-ENABLED ACCESS POINT WITH POWER SAVING (71) Applicant: Apple Inc., Cupertino, CA (US)

(72) Inventors: Guoqing Li, Campbell, CA (US); Oren Shani, Saratoga, CA (US); Yong Liu, Campbell, CA (US); Christiaan A. Hartman, San Jose, CA (US); Jarkko L. Kneckt, Los Gatos, CA (US); Joonsuk Kim, Saratoga, CA (US); Su Khiong Yong, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 182 days.

(21) Appl. No.: 15/615,218

(22) Filed: Jun. 6, 2017

(65) Prior Publication Data
US 2017/0353921 A1 Dec. 7, 2017

Related U.S. Application Data (60) Provisional application No. 62/346,276, filed on Jun. 6, 2016.

(51) Int. Cl.
H04W 52/02 (2009.01)
(52) U.S. Cl.
CPC ... H04W 52/0206 (2013.01); H04W 52/0274 (2013.01); H04W 52/0203 (2013.01); H04W 52/0229 (2013.01); Y02D 70/1242 (2018.01); Y02D 70/1262 (2018.01); Y02D 70/1264 (2018.01); Y02D 70/14 (2018.01); Y02D 70/142 (2018.01); Y02D 70/144 (2018.01); Y02D 70/166 (2018.01); Y02D 70/22 (2018.01); Y02D 70/26 (2018.01)

(58) Field of Classification Search
None
See application file for complete search history.

(56) References Cited

U.S. PATENT DOCUMENTS

| 2009/0034443 | A1* | 2/2009 | Walker | H04W 52/0274 370/311 |
| 2014/0321415 | A1* | 10/2014 | You | H04W 36/0055 370/329 |
| 2016/0113055 | A1* | 4/2016 | Fan | H04W 76/18 370/329 |
| 2016/0219510 | A1* | 7/2016 | Asterjadhi | H04W 52/0274 |
| 2016/0353417 | A1* | 12/2016 | Kim | H04W 72/10 |

* cited by examiner

Primary Examiner — Robert M Morlan
(74) Attorney, Agent, or Firm — Dickinson Wright RLLP (57) ABSTRACT An access point establishes target wakeup times (TWTs) with one or more associated electronic devices in a WLAN. The access point transitions to a power-saving mode outside of the one or more TWTs. The access point maintains synchronization with the one or more electronic devices, during at least a first TWT in the one or more TWTs, by transmitting, to the one or more electronic devices, a TWT beacon that includes, or in conjunction with, synchronization information. Alternatively or additionally, during at least the first TWT, the access point transmits a multi-user trigger frame that includes the synchronization information to the one or more electronic devices. In response to the multi-user trigger frame, the access point receives data frames from the one or more electronic devices, transmits one or more acknowledgments, and transitions into the power-saving mode during a remainder of at least the first TWT.

20 Claims, 7 Drawing Sheets

SOFTWARE-ENABLED ACCESS POINT WITH POWER SAVING

CROSS-REFERENCE TO RELATED APPLICATIONS

This Application claims the benefit of U.S. Provisional Patent Application No. 62/346,276, entitled "SOFTWARE-ENABLED ACCESS POINT WITH POWER SAVING" filed Jun. 6, 2016, the content of which is incorporated herein by reference in its entirety for all purposes.

FIELD

The described embodiments relate, generally, to wireless communications among electronic devices in a wireless local area network (WLAN), including electronic devices and access points, and techniques for reducing power consumption of a software-enabled access point and associated electronic devices.

BACKGROUND

Many electronic devices communicate via wireless local area networks (WLANs), such as those based on a communication protocol that is compatible with an IEEE 802.11 standard (which is sometimes referred to as 'Wi-Fi'). For example, in a WLAN, an electronic device may discover and associate with an access point. Subsequently, this electronic device may communicate with the access point, such as transmitting and receiving frames.

However, IEEE 802.11 standards typically do not allow the access point to transition into a power-saving mode. For example, many associated electronic devices rely real-time availability of the access point to deliver uplink and downlink data traffic. Moreover, electronic devices may need to associate with the access point at any time. Consequently, the access point may need to remain in an active operating mode.

While continuous operation (and thus continuous availability) of such infrastructure access points can facilitate enhanced communication performance, this power-management approach can increase the power consumption of the access points, as well as the associated electronic devices, which may not be suitable for some applications or environments.

SUMMARY

Some embodiments that relate to an access point that selectively transitions to a power-saving mode are described. In particular, during operation, an interface circuit in the access point may establish one or more target wakeup times (TWTs) with one or more associated electronic devices, and the interface circuit may transition to the power-saving mode outside of the one or more TWTs. Moreover, the interface circuit may maintain synchronization with the one or more electronic devices, during at least a first TWT in the one or more TWTs, by transmitting, to the one or more electronic devices, a TWT beacon that includes (or in conjunction with) synchronization information.

Alternatively or additionally, during at least the first TWT, the interface circuit transmits a multi-user trigger frame that includes the synchronization information to the one or more electronic devices. In response to the multi-user trigger frame, the interface circuit receives data frames from the one or more electronic devices, transmits an acknowledgment to the one or more electronic devices, and transitions into the power-saving mode during a remainder of at least the first TWT.

Note that in some embodiments the access point may be a software-enabled access point.

Moreover, the synchronization information in the multi-user trigger frame and/or the TWT beacon may include one or more of: a timestamp field, and change information associated with the communication between the access point and the one or more electronic devices.

Additionally, the TWT beacon may be transmitted at a beginning of at least the first TWT.

Moreover, at a beacon-transmission time outside of the one or more TWTs, the interface circuit may transition to a higher-power operating mode and may transmit a beacon with the change information. Then, after transmitting the beacon, the interface circuit may transition back to the power-saving mode. Note that a frequency of the beacon transmissions may be less than a predefined value.

Furthermore, during a given TWT in the one or more TWTs, the access point may have higher priority to access a channel than the one or more electronic devices. For instance, the access point may start reducing backoff sooner than the one or more electronic devices, or the access point may apply a smaller backoff value than the one or more electronic devices.

Note that, after transmitting the acknowledgment and before an end of at least the first TWT, the interface circuit may transition to the power-saving mode if the one or more electronic devices indicate, in a last one of the data frames, transitioning to a second power-saving mode.

Additionally, after transmitting the TWT beacon during at least the first TWT, the interface circuit may transmit multicast/broadcast information. Additionally or alternatively, after transmitting the TWT beacon during at least the first TWT, the interface circuit may transmit unicast/individually addressed information.

In some embodiments, the interface circuit skips transmitting TWT beacons during at least one of the one or more TWTs.

Other embodiments include operation with or by one or more electronic devices. For example, the one or more electronic devices may transition to the second power-saving mode at times outside of the one or more TWTs and/or after transmitting the data frames. Moreover, the one or more electronic devices may refrain from transitioning from the second power-saving mode to a second higher-power operating mode to receive at least some beacons transmitted at the beacon-transmission times. Instead, the one or more electronic devices may wake up to receive the TWT beacons and/or the multi-user trigger frames in order to maintain the synchronization with the access point and/or to obtain change information. When the change information indicates that a change has occurred, the one or more electronic devices may wake up to receive a subsequent beacon.

Other embodiments provide an interface circuit in the access point or in an electronic device.

Other embodiments provide a computer-program product for use with the interface circuit in the access point and/or an electronic device. This computer-program product includes instructions for at least some of the aforementioned operations performed by the interface circuit in the access point or an electronic device.

Other embodiments provide a method for selectively transitioning to the power-saving mode. The method includes at least some of the aforementioned operations performed by the interface circuit in the access point or in an electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

An access point (such as a software-enabled access point, which is sometimes referred to as a 'soft access point') may set up one or more TWTs with an associated electronic device in a WLAN. Then, the access point may transition to a power-saving mode outside of the one or more TWTs. Moreover, the access point may maintain synchronization with the electronic device by, during at least a first TWT in the one or more TWTs, transmitting, to the electronic device, a TWT beacon with synchronization information. Alternatively or additionally, during at least the first TWT, the access point may transmit a multi-user trigger frame with the synchronization information to the electronic device. In response to the multi-user trigger frame, the access point may receive data frames from the electronic device and may transmit an acknowledgment to the electronic device. Next, the access point may transition into the power-saving mode during a remainder of at least the first TWT.

By selectively transitioning to the power-saving mode while maintaining the synchronization, this communication technique may facilitate improved battery life in the access point and/or the electronic device without adversely affecting the communication performance. Consequently, the communication technique may improve the user experience when using the access point or the electronic device, and thus may increase customer satisfaction and retention.

Note that the communication technique may be used during wireless communication between electronic devices in accordance with a communication protocol, such as: an IEEE 802.11 standard (which is sometimes referred to as Wi-Fi). For example, the communication technique may be used with IEEE 802.11ax, which is used as an illustrative example in the discussion that follows. However, this communication technique may also be used with a wide variety of other communication protocols, and in access points and electronic devices (such as portable electronic devices or mobile devices) that can incorporate multiple different radio access technologies (RATs) to provide connections through different wireless networks that offer different services and/or capabilities.

In particular, an electronic device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution (LTE), LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations, client electronic devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). Note that in some embodiments the access point may be implemented as a soft access point, in which software executing on an electronic device (such as a computer or a cellular telephone) allows the electronic device to support Wi-Fi links with a small number of associated electronic devices (i.e., a soft access point may be a 'hotspot' for the small number of associated electronic devices). In the discussion that follows a soft access point is used as an illustrative example. However, in other embodiments, the communication technique is applied to a so-called infrastructure (or hardware or traditional) access point.

Additionally, it should be understood that the electronic devices described herein may be configured as multi-mode wireless communication devices that are also capable of communicating via different 3G and/or second generation (2G) RATs. In these scenarios, a multi-mode electronic device or user equipment (UE) can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

Figure 1:
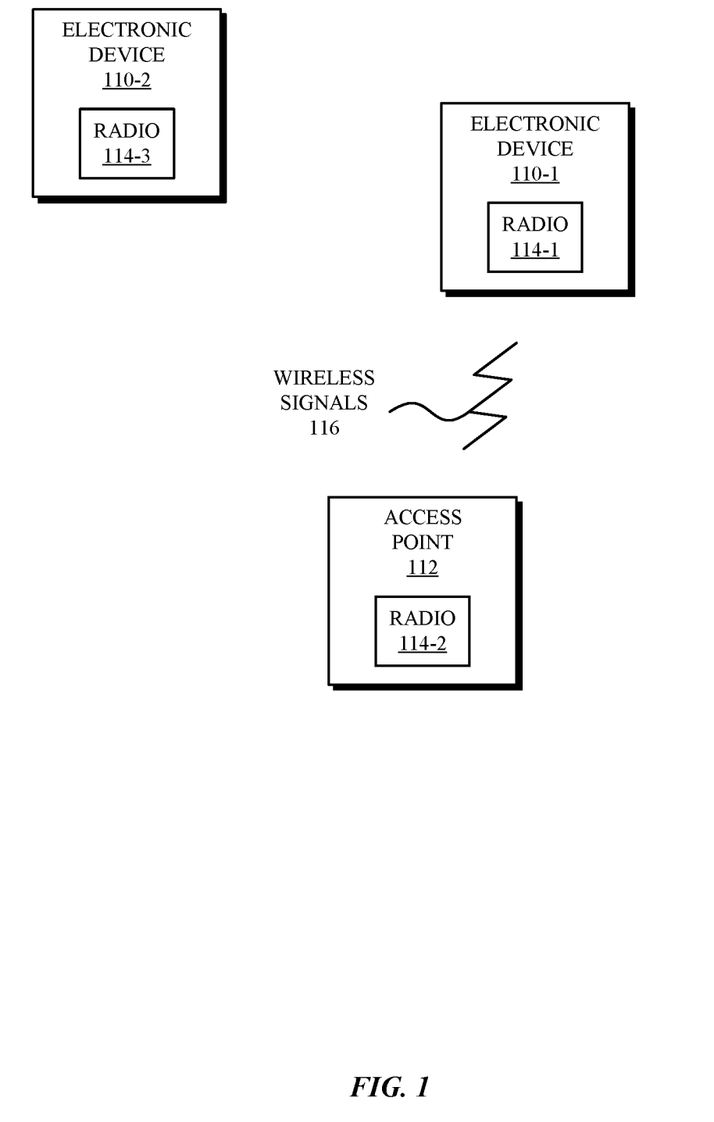
FIG. 1 is a block diagram illustrating an example of electronic devices communicating wirelessly.

We now describe the communication technique. FIG. 1 presents a block diagram illustrating an example of electronic devices communicating wirelessly. In particular, one or more electronic devices 110 (such as a smartphone, a laptop computer, a notebook computer, a tablet, or another such electronic device, which is sometimes referred to as a 'primary electronic device') and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device.

As described further below with reference to FIG. 7, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112 to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 (which is used as an illustration) and access point 112, respectively. For example, as noted previously, access point 112 and electronic device 110-1 may exchange packets using a Wi-Fi communication protocol in a WLAN. In particular, access point 112 and electronic device 110-1 may define or set up one or more TWTs. Outside of the one or more TWTs, electronic device 110-1 and access point 112 may transition, respectively, to power-saving modes of operation (such as sleep modes).

This approach may facilitate power saving both for electronic device 110-1 and access point 112, such as when access point 112 is a soft access point (e.g., a laptop computer or a cellular telephone) that acts as an access point to support multiple Wi-Fi links with a small number of electronic devices (such as three or four electronic devices). Because of the small number of associated electronic devices in these embodiments, it is less important for the soft access point to stay awake, so the soft access point may transition to a power-saving mode of one or more available power-saving modes.

In order to maintain synchronization between access point 112 and electronic device 110-1, access point 112 may transmit, to electronic device 110-1, a TWT beacon with synchronization information during at least a first TWT in the one or more TWTs. As described further below with reference to FIG. 4, the TWT beacon may be transmitted at a beginning of at least the first TWT. After the TWT beacon is transmitted during at least the first TWT, access point 112 may or may not transmit TWT beacons in subsequent TWTs. In particular, access point 112 may skip transmitting TWT beacons in one or more subsequent TWTs. In some embodiments, after transmitting the TWT beacon during at least the first TWT, access point 112 may transmit multicast/broadcast information.

Alternatively or additionally, during at least the first TWT and/or one or more subsequent TWTs, access point 112 may transmit a multi-user trigger frame with the synchronization information to electronic device 110-1. In response to the multi-user trigger frame, electronic device 110-1 may transmit one or more data frames to access point 112. Then, access point 112 may transmit an acknowledgment to electronic device 110-1. Next, access point 112 may transition into the power-saving mode during a remainder of at least the first TWT and/or the one or more subsequent TWTs. In some embodiments, after transmitting the acknowledgment and before an end of at least the first TWT, access point 112 may transition to the power-saving mode if electronic device 110-1 indicates, in at least a last one of the data frames, that it is transitioning to a power-saving mode.

Figure 5:
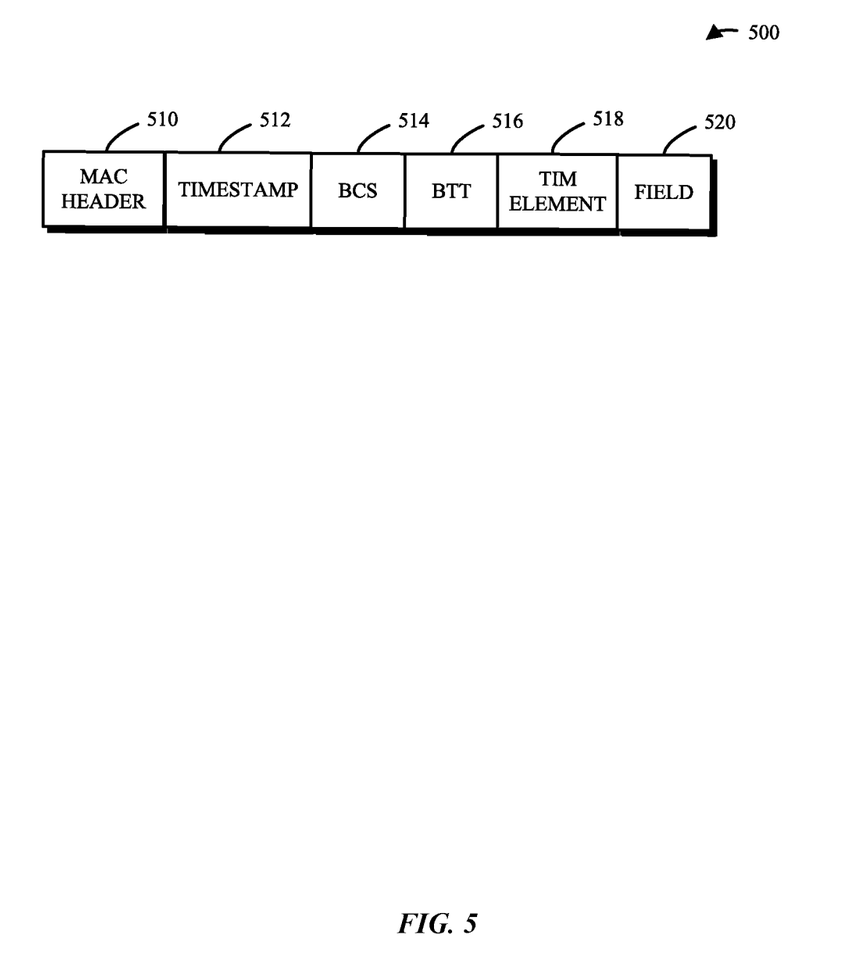
FIG. 5 is a drawing illustrating an example of a target wakeup time (TWT) beacon.
Figure 6:
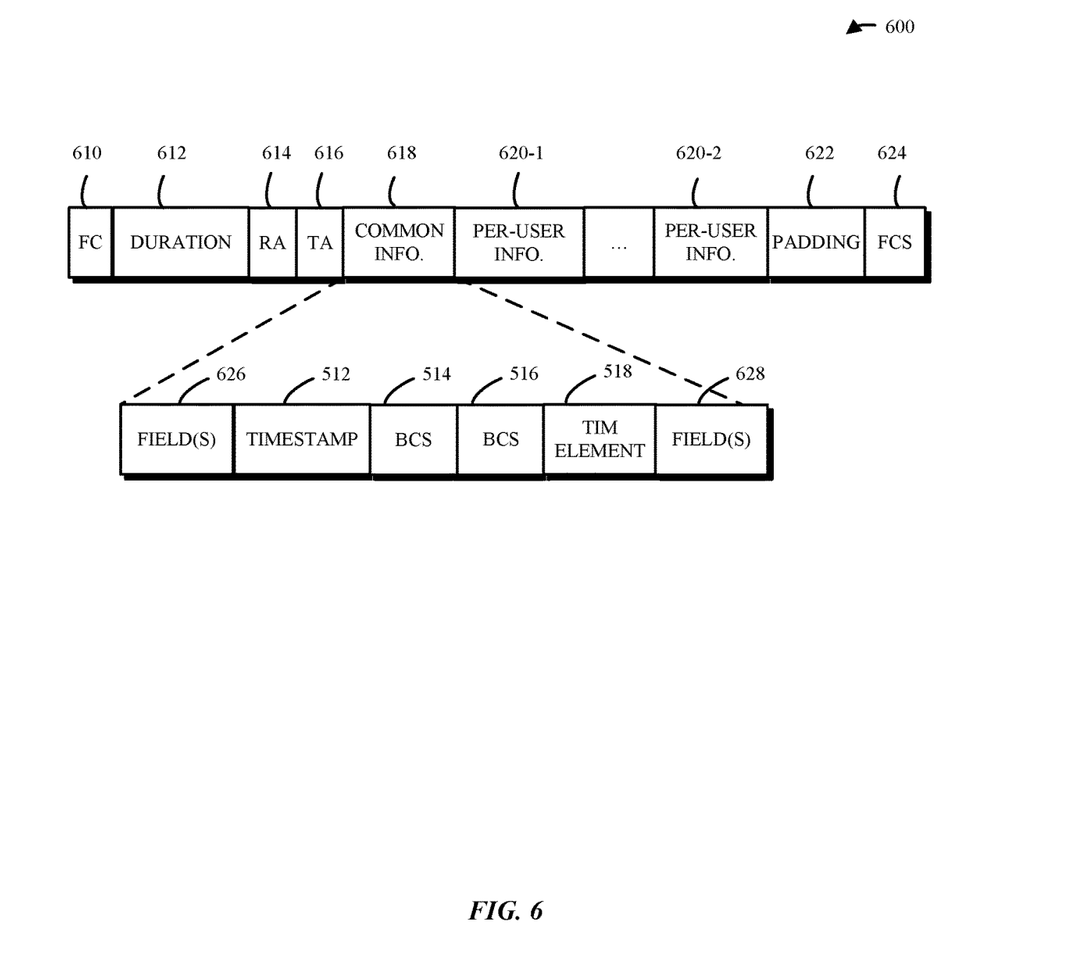
FIG. 6 is a drawing illustrating an example of a multi-user trigger frame.

As described further below with reference to FIGS. 5 and 6, the synchronization information in the TWT beacon and/or the multi-user trigger frame may include: a timestamp field, and/or change information associated with the communication between access point 112 and electronic device 110-1 (such as information that specifies the channel used during the communication).

Furthermore, at a beacon-transmission time outside of the one or more TWTs, access point 112 may transition to a higher-power operating mode (such as a normal operating mode) and may transmit a beacon with the change information. Then, after transmitting the beacon, access point 112 may transition back to the power-saving mode. Note that a frequency of the beacon transmissions may be less than a predefined value (such as less than 3.33 Hz). Thus, the use the of the TWT beacon(s) and/or the multi-cast trigger frame(s) may allow the beacons to be transmitted less frequently, thereby further conserving power of access point 112 and electronic device 110-1 because both may transition less frequently to higher-power modes than their respective power-saving modes (i.e., they may wake up less often). In some embodiments, if the change information in a TWT beacon indicates that there has been a substantive change (such as a change in the channel), electronic device 110-1 may wake up to receive a subsequent beacon.

In order to allow access point 112 and electronic device 110-1 to transition to their respective sleep modes (and, thus, to save power), during a given TWT in the one or more TWTs, access point 112 may have higher priority to access a channel than electronic device 110-1.

In these ways, the communication technique may allow electronic devices 110 and access point 112 to reduce power consumption while maintaining synchronization and, thus, the communication performance. These capabilities may improve the user experience when using electronic devices 110 and/or access point 112.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metric may include any or all of: a received signal strength indicator (RSSI), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated maximum data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
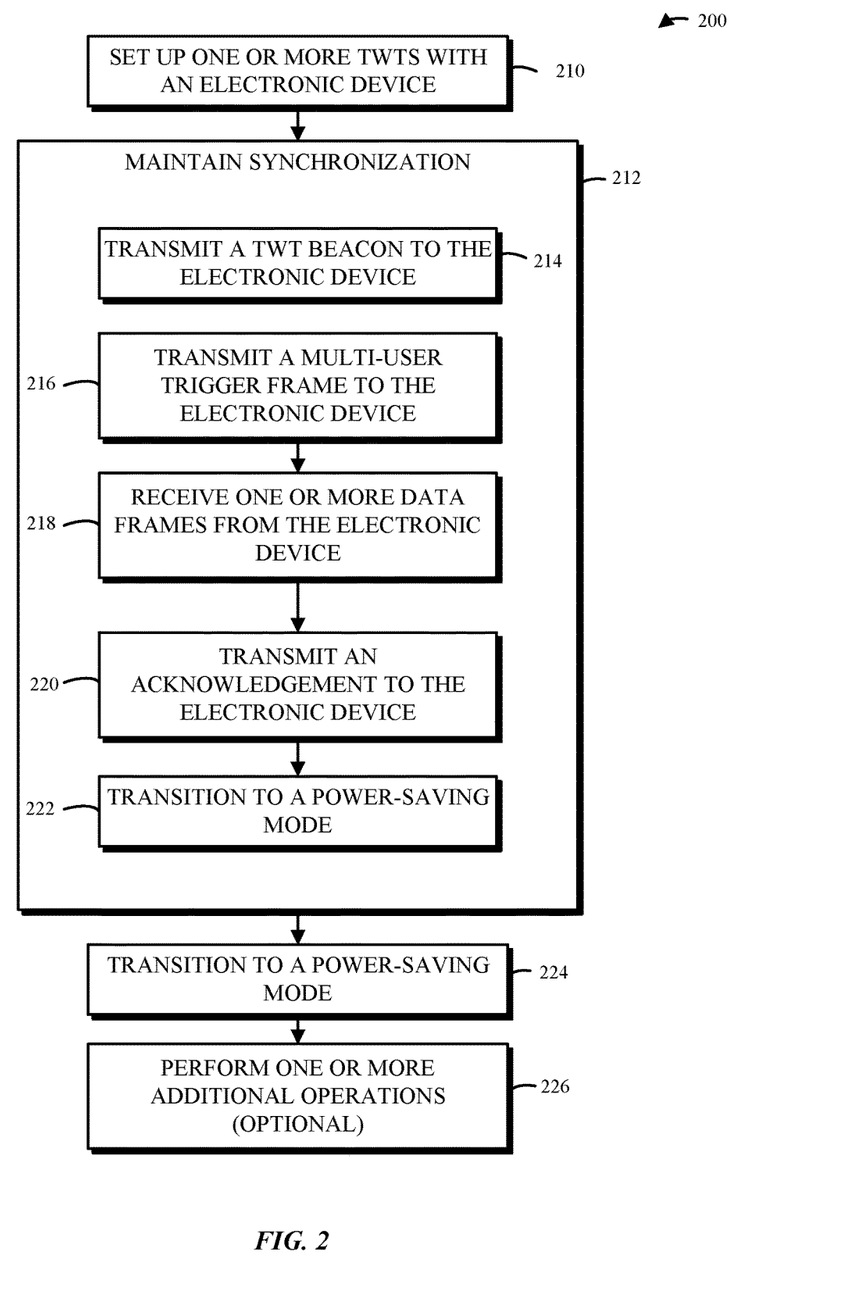
FIG. 2 is a flow diagram illustrating an example of a method for selectively transitioning to a power-saving mode using one of the electronic devices in FIG. 1.

FIG. 2 presents a flow diagram illustrating an example method 200 for selectively transitioning to a power-saving mode in accordance with some embodiments. This method may be performed by an access point (and, more generally, an electronic device), such as an interface circuit in access point 112 in FIG. 1. During operation, the access point may set up one or more TWTs (operation 210) with an associated electronic device. Moreover, the access point may transition to the power-saving mode (operation 224) outside of the one or more TWTs.

Furthermore, the access point can maintain synchronization (operation 212) with the electronic device. For example, during at least a first TWT in the one or more TWTs, the access point may transmit, to the electronic device, a TWT beacon (operation 214) with synchronization information. Alternatively or additionally, during at least the first TWT, the access point may transmit a multi-user trigger frame (operation 216) with the synchronization information to the electronic device. In response to the multi-user trigger frame, the access point may receive one or more data frames (operation 218) from the electronic device and may transmit an acknowledgment (operation 220) to the electronic device. Next, the access point may transition into the power-saving mode (operation 222) during a remainder of at least the first TWT. For example, after transmitting the acknowledgment (operation 222) and before an end of at least the first TWT, the access point may transition to the power-saving mode if the electronic device indicates, in at least a last one of the data frames, that it is transitioning to a second power-saving mode.

In some embodiments, the access point optionally performs one or more additional operations (operation 226). For example, the access point may optionally transmit multicast/broadcast information after transmitting the TWT beacon during at least the first TWT. Additionally or alternatively, the access point may optionally transmit individually addressed unicast frames to one or more electronic devices, e.g., stations (STAs) that are available. Moreover, the access point may skip transmitting TWT beacons during at least some of the one or more TWTs, such as a TWT after the first TWT. Furthermore, at a beacon-transmission time outside of the one or more TWTs, the access point may transition to a higher-power operating mode and may transmit a beacon with the change information. Then, after transmitting the beacon, the access point may transition back to the power-saving mode.

Note that in some embodiments of method 200, there may be additional or fewer operations. Moreover, the order of the operations may be changed, and/or two or more operations may be combined into a single operation.

In some embodiments, at least some of the operations in method 200 are performed by interface circuits in the access point or the electronic device. For example, at least some of the operations may be performed by firmware executed by an interface circuit, such as firmware associated with a MAC layer, as well as one or more circuits in a physical layer in the interface circuit.

Figure 3:
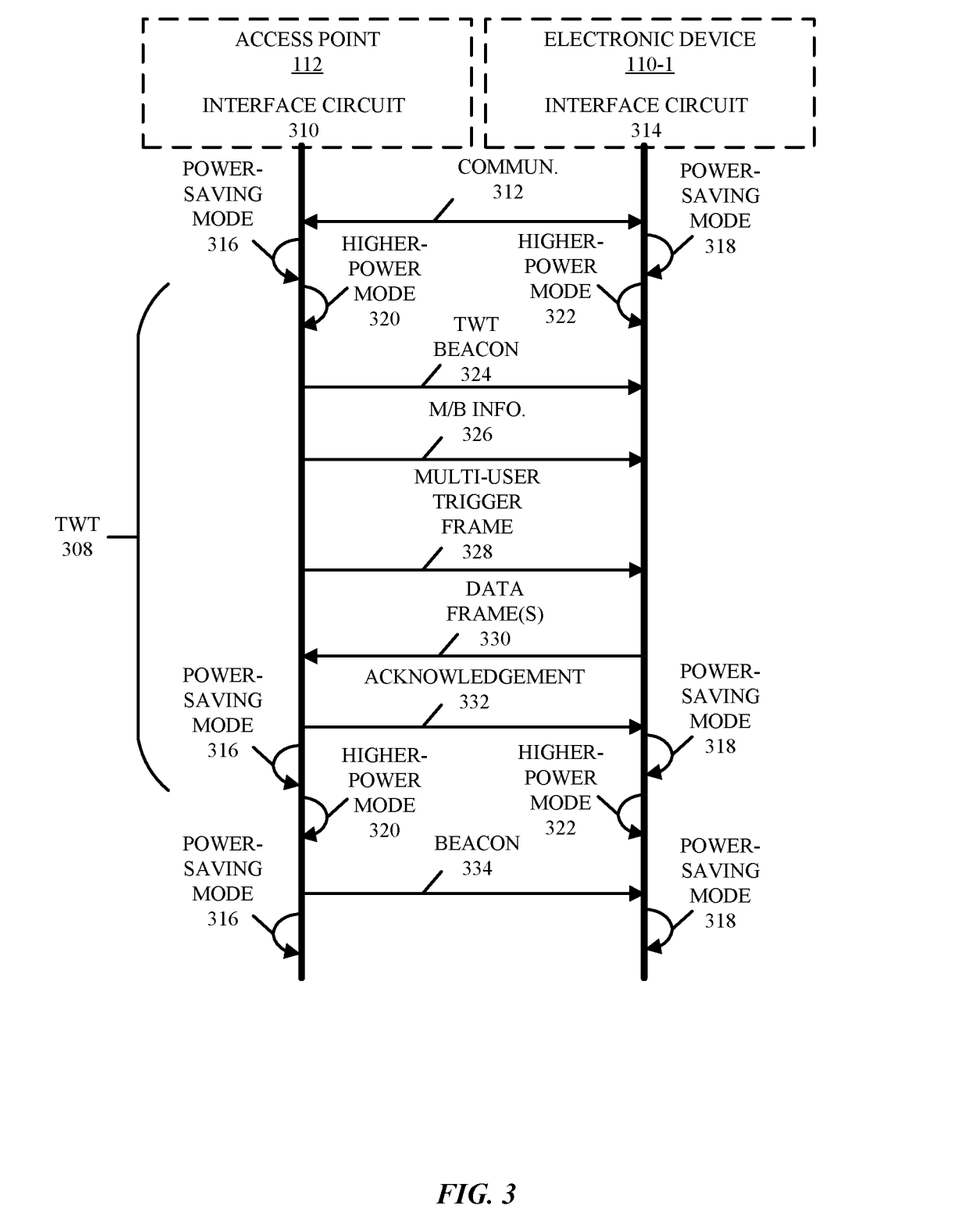
FIG. 3 is a flow diagram illustrating an example of communication between electronic devices, such as the electronic devices of FIG. 1.

The communication techniques are further illustrated in FIG. 3, which presents a flow diagram illustrating an example of communication between electronic devices 110 and access point 112. In particular, interface circuit 310 in access point 112 may set up one or more TWTs by communicating 312 with interface circuit 314 in electronic device 110-1. Outside of the one or more TWTs, interface circuits 310 and 314 may transition to their respective power-saving modes 316 and 318. Alternatively or additionally, the transition to power-saving mode 318 may occur after the access point 112 receives one or more acknowledgements (ACKs) from the electronic device 110-1. If the transmission of data frames 330 fails, there may be no retransmissions of the data frames 330, in some embodiments. Transitioning to a power save mode after receiving one or more ACKs is further described herein below.

In order to maintain synchronization, during one or more of the TWTs (such as TWT 308), interface circuit 310 may transition to a higher-power mode 320 and interface circuit 314 may transition to a higher-power mode 322. Then, interface circuit 310 may transmit a TWT beacon 324 with synchronization information to interface circuit 314. In some embodiments, after transmitting TWT beacon 324, interface circuit 310 optionally transmits multicast/broadcast information (MB info.) 326. In some embodiments, interface circuit 310 of the access point 112 optionally transmits downlink (DL) individually addressed or unicast data frames (not shown in FIG. 3) to one or more electronic devices 110, e.g., to electronic device 110-1. In some embodiments, DL unicast or individually addressed data frames can be transmitted by the interface circuit 310 of the access point 112 to one or more electronic devices 110, e.g., to electronic device 110-1, along with multicast/broadcast information 326. In some embodiments, DL unicast or individually addressed data frames by the access point 112 to one or more electronic devices 110, e.g., to electronic device 110-1, along with the multi-user trigger frame 328.

Alternatively or additionally, during one or more of the TWTs (such as TWT 308), interface circuit 310 may transmit a multi-user trigger frame 328 with the synchronization information to interface circuit 314. After receiving multi-user trigger frame 328, interface circuit 314 may transmit one or more data frames 330 to interface circuit 310. In response, interface circuit 310 may transmit an acknowledgment 332 to interface circuit 314. Note that interface circuit 314 may transition to power-saving mode 318 before receiving acknowledgement 332. If one of data frames 330 indicates that interface circuit 314 is transitioning to power-saving mode 318, interface circuit 310 may transition to power-saving mode 316 before an end of the session period for the current TWT.

In some embodiments, a session period of a current TWT may terminate early after the access point 112 transmits to an electronic device 110, e.g., to electronic device 110-1, a frame that includes an end-of-session-period (EOSP) field having a value of "one" or a more-data filed having a value of "zero", where the electronic device 110 sends back to the access point 112 an acknowledgement (ACK) of receipt of the frame. In some embodiments, the electronic device 110 can indirectly control termination of the session period of the current TWT. In some embodiments, the access point 112 terminates a session period early by sending to the electronic device 110 indicating termination of the session period and after receiving a corresponding ACK from the electronic device.

In some embodiments, at a beacon-transmission time outside of the one or more TWTs, interface circuit 310 may transition to higher-power mode 320 and interface circuit 314 may optionally transition to higher-power mode 322. Then, interface circuit 310 may transmit a beacon 334 with the change information to interface circuit 314. Then, after transmitting beacon 334, interface circuit 310 may transition back to power-saving mode 316 and interface circuit 314 may optionally transition back to power-saving mode 318.

Exemplary Embodiments

We now describe embodiments of the communication technique. One challenge associated with allowing an access point to transition to a power-saving mode is how an associated electronic device or station will know whether the access point is in the power-saving mode and/or when it can start exchanging downlink and uplink traffic with the access point. In the communication technique, this is addressed by using one or more TWTs as an agreed wake-up window (and duration) between the access point and the electronic device. Outside of the agreed TWT service period or window, the access point (and the electronic device) may be allowed to sleep. Thus, instead of only allowing the electronic device to sleep outside of the TWT service period, the access point may also be allowed to sleep.

Another challenge is how to allow the access point to minimize the beacon transmissions in order to increase the power saving. Stated differently, another challenge is how to minimize beacon reception for the associated electronic device to increase the power saving while maintaining synchronization between the access point and the electronic device. These challenges are addressed in the communication technique by defining a TWT beacon that includes synchronization information. For example, the TWT beacon may include a 'timestamp' field. Similarly, an IEEE 802.11ax multi-user trigger frame may include synchronization information so that the electronic device can synchronize with the access point if the TWT beacon is not transmitted by the access point.

Figure 4:
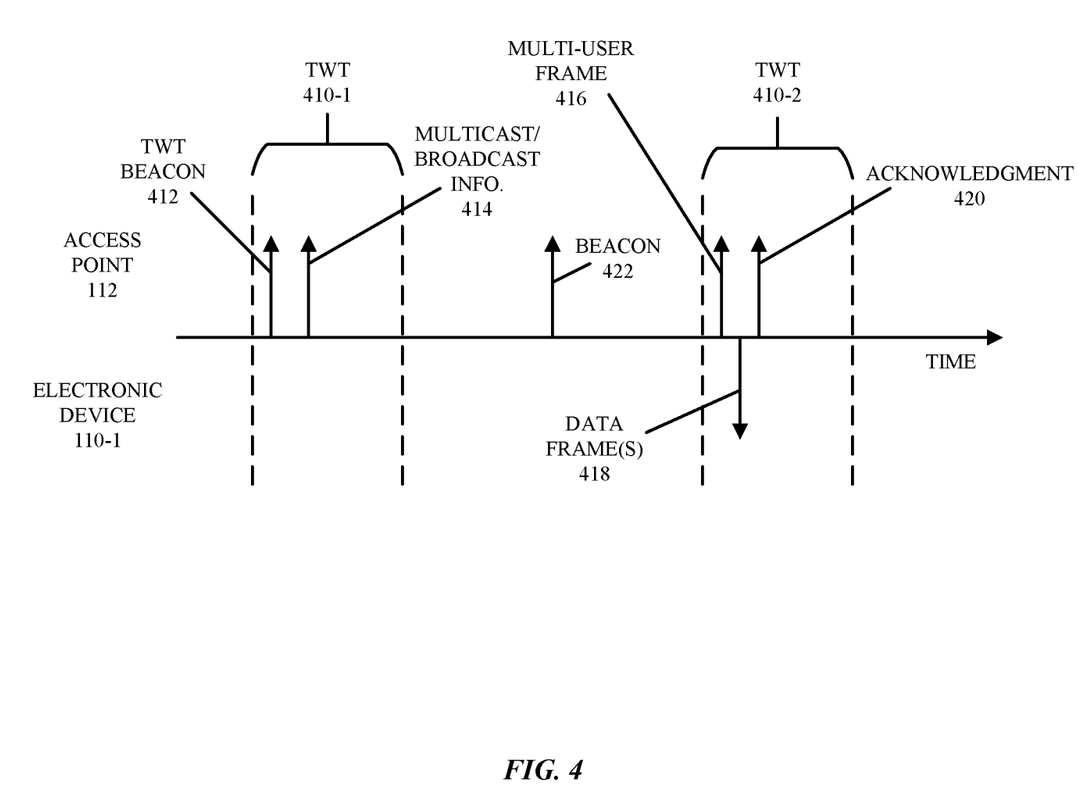
FIG. 4 is a timing diagram illustrating an example of communication between electronic devices, such as the electronic devices of FIG. 1.

FIG. 4 presents a timing diagram illustrating an example of communication between electronic devices, such as the electronic devices of FIG. 1. In particular, TWT session periods 410 may be defined or set up by access point 112 and electronic device 110-1. During one or more of TWT session periods 410 (such as TWT session period 410-1), access point 112 may transmit TWT beacon 412 with synchronization information. In some embodiments, access point 112 transmits multicast/broadcast information 414 after transmitting TWT beacon 412.

Alternatively or additionally, access point 112 may transmit a multi-user trigger frame 416 with the synchronization information. In response, electronic device 110-1 may transmit one or more data frames 418, and access point 112 may transmit an acknowledgment 420.

In addition, outside of TWT session periods 410, access point 112 may transmit beacons (such as beacon 422) with the change information.

Note that TWT beacon 412 (which is sometimes referred to as 'TWT beacon frame') may be a modified version of a SIG beacon in IEEE 802.11ah. In particular, while the SIG beacon in IEEE 802.11ah is sent at frequent intervals between regular beacons, the TWT beacon(s) may only be transmitted in the beginning of the TWT service period(s). In addition, the SIG beacon format may be changed to create a TWT beacon. This is shown in FIG. 5, which presents a drawing illustrating an example of a TWT beacon 500. In particular, TWT beacon 500 may include: a media access control (MAC) header 510 (with a frame control field, a duration, addresses, etc.), a timestamp 512 (such as 8 octets), a beacon change sequence (BCS) 514 (which may specify the change information), a next beacon transmission time (BTT) 516, an optional traffic indication map (TIM) element 518 (which may indicate whether an access point has pending traffic to be transmitted and individually addressed to an electronic device), and/or another optional field 520.

Using TWT Beacon 500, the access point can send regular beacon infrequently (such as less often than every 100 ms), and may only send the short TWT beacon in the beginning of a TWT service period. More generally, the frequency of the TWT beacons may be dependent on the traffic profile and the implementation. For example, with messages or low data-rate traffic, a time interval between the TWT beacons may be 1 s (i.e., longer than the beacon-transmission time intervals for the regular beacons). Note that the TWT beacon(s) may be transmitted in a time period having a time duration of 100 μs.

In this way, the access point can go to sleep outside of TWT window most of the time except for the very infrequent beacon transmissions. Moreover, electronic devices that have associated with the access point and that have setup the TWT service period(s) can skip beacon reception and may wake up during the TWT window to receive a TWT beacon and, thus, to maintain synchronized with access point and to get useful information. When the electronic device notices or detects changes in the TWT beacon, it can wake up at the next regular beacon transmission time to get the updated system information (including synchronization information). For example, a change in the TWT beacon may include a channel switch.

In order to further reduce the overhead of transmitting the TWT beacon in the beginning of the TWT session period, some optional fields may be included in a multi-user trigger frame when the access point devices not to transmit a TWT beacon in a TWT session period. This is shown in FIG. 6, which presents a drawing illustrating an example of a multi-user trigger frame 600. In particular, trigger frame 600 may include: frame control (FC) 610, duration 612, receive address (RA) 614, transmit address (TA) 616, common information 618, one or more instances of per-user information 620, padding 622 and/or frame check sequence (FCS) 624. Moreover, common information 618 may include: other field(s) 626 of common information, timestamp 512, a beacon change sequence 514, a next beacon transmission time 516, an optional traffic indication map element 518, and/or other field(s) 628 of common information.

We now describe the access-point power-saving operation. After setting up the TWT with the associated electronic device and during the TWT service period, the access point may use a higher priority to access the channel in order to send the TWT beacon or the multi-user trigger frame ahead of the electronic device. This arrangement may allow the access point and the electronic device to subsequently go to sleep. Moreover, the access point may optionally transmit a TWT beacon in the beginning of the TWT service period. If the TWT beacon is not sent, then the access point may transmit a multi-user trigger frame that includes the optional fields needed for the electronic device to be synchronized with the WLAN. Furthermore, if there is any changes to the change information, the access point may update the beacon change sequence value. Note that after the first exchange with the electronic device (e.g., in at least the first TWT), if the electronic device indicates that it is transitioning to a power-saving mode, the access point may go to sleep before end of TWT service period. Furthermore, the access point may go to sleep outside of TWT service period(s) except to optionally send or transmit regular beacons very infrequently (thus, the access point may or may not transmit the regular beacons).

Note that multicast and broadcast traffic are usually delivered after a delivery traffic indication message (DTIM) beacon (a specific beacon that may be transmitted every third regular beacons). However, because the access point may transmit the regular beacons very infrequently, the access point may choose to deliver some multicast and/or the broadcast traffic after the TWT beacon to a particular electronic device instead of delivering the multicast and/or the broadcast traffic after a delivery traffic indication message beacon.

We now describe the electronic device power-saving operation. After negotiating the one or more TWTs with the access point, the electronic device may stay awake at least until it receives a first multi-user trigger frame, responds to the multi-user trigger frame and receives an acknowledgement from the access point (i.e., at least one transaction). This approach may avoid an unsynchronized view on the status of the electronic device between the access point and the electronic device. Moreover, after the first exchange with the access point, the electronic device may go to sleep before end of the TWT service period by indicating its power save mode change in the last frame it transmits to the access point, which may be correctly acknowledged by the access point. Note that the electronic device may go to sleep outside of the TWT window.

In summary, a TWT beacon and a modified multi-user trigger frame format can be defined for use with, e.g., IEEE 802.11ax. The TWT beacon may be transmitted at the beginning of TWT service period with information that can be used to synchronize the electronic device. In order to save power and overhead, the access point may skip sending TWT beacons in some of the TWT service periods. If the access point skips transmitting a TWT beacon, it may transmit a multi-user trigger frame with the information that can be used to synchronize the electronic device. Moreover, the electronic device may skip regular beacon reception if there is no change indicated in TWT beacon or the multi-user trigger frame. In order to save power, some basic rules may be defined for the access point and the electronic device. For example, the electronic device may stay awake until it gets a multi-user trigger frame from the access point, sends one or more data frames and receives a correct acknowledgement.

We now describe embodiments of an electronic device. FIG. 7 presents a block diagram of an electronic device 700 (which may be an access point, another electronic device, such as a station) in accordance with some embodiments. This electronic device includes processing subsystem 710, memory subsystem 712, and networking subsystem 714. Processing subsystem 710 includes one or more devices configured to perform computational operations. For example, processing subsystem 710 can include one or more microprocessors, application-specific integrated circuits (ASICs), microcontrollers, programmable-logic devices, and/or one or more digital signal processors (DSPs).

Memory subsystem 712 includes one or more devices for storing data and/or instructions for processing subsystem 710 and networking subsystem 714. For example, memory subsystem 712 can include dynamic random access memory (DRAM), static random access memory (SRAM), a read-only memory (ROM), flash memory, and/or other types of memory. In some embodiments, instructions for processing subsystem 710 in memory subsystem 712 include: one or more program modules or sets of instructions (such as program module 722 or operating system 724), which may be executed by processing subsystem 710. For example, a ROM can store programs, utilities or processes to be executed in a non-volatile manner, and DRAM can provide volatile data storage, and may store instructions related to the operation of electronic device 700. Note that the one or more computer programs may constitute a computer-program mechanism, a computer-readable storage medium or software. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710. In some embodiments, the one or more computer programs are distributed over a network-coupled computer system so that the one or more computer programs are stored and executed in a distributed manner.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Figure 7:
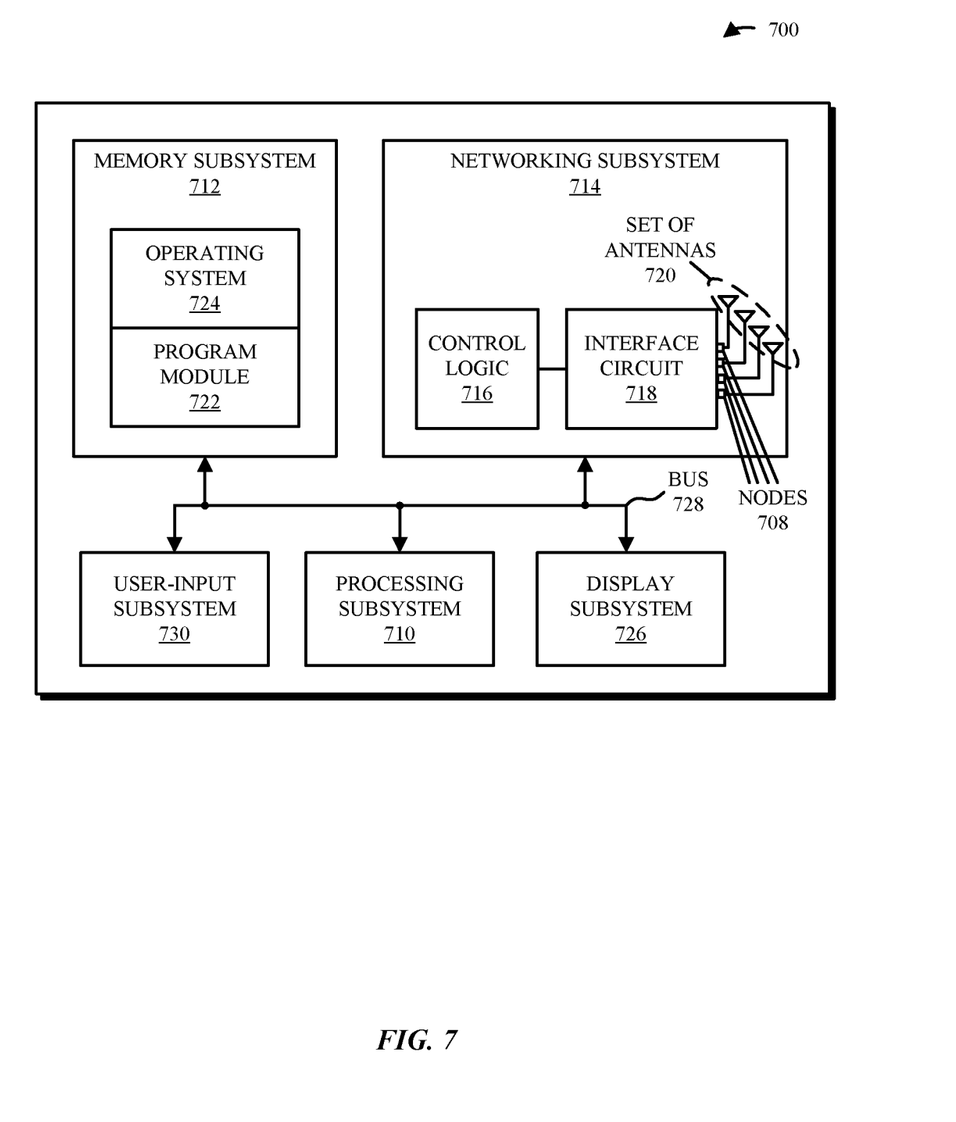
FIG. 7 is a block diagram illustrating an example of one of the electronic devices of FIG. 1.

Networking subsystem 714 includes one or more devices configured to couple to and communicate on a wired and/or wireless network (i.e., to perform network operations), including: control logic 716, an interface circuit 718 and a set of antennas 720 (or antenna elements) in an adaptive array that can be selectively turned on and/or off by control logic 716 to create a variety of optional antenna patterns or 'beam patterns.' (While FIG. 7 includes set of antennas 720, in some embodiments electronic device 700 includes one or more nodes, such as nodes 708, e.g., a pad, which can be coupled to set of antennas 720. Thus, electronic device 700 may or may not include set of antennas 720.) For example, networking subsystem 714 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between the electronic devices, e.g., transmitting advertising or beacon frames and/or scanning for advertising frames transmitted by other electronic devices.

Within electronic device 700, processing subsystem 710, memory subsystem 712, and networking subsystem 714 are coupled together using bus 728 that facilitates data transfer between these components. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc. Display subsystem 726 may be controlled by processing subsystem 710 to display information to a user (e.g., information relating to incoming, outgoing, or an active communication session).

Electronic device 700 can also include a user-input subsystem 730 that allows a user of the electronic device 700 to interact with electronic device 700. For example, user-input subsystem 730 can take a variety of forms, such as: a button, keypad, dial, touch screen, audio input interface, visual/image capture input interface, input in the form of sensor data, etc.

Electronic device 700 can be (or can be included in) any electronic device with at least one network interface. For example, electronic device 700 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments program module 722 is included in operating system 724 and/or control logic 716 is included in interface circuit 718.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 714. This integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 722, operating system 724 (such as a driver for interface circuit 718) or in firmware in interface circuit 718. Alternatively or additionally, at least some of the operations in the communication technique may be implemented in a physical layer, such as hardware in interface circuit 718. In some embodiments, the communication technique is implemented, at least in part, in a MAC layer and/or in a physical layer in interface circuit 718. For example, the communication technique may be implemented in a lower MAC layer. In particular, the TWT beacons and/or the multi-user trigger frames may be constructed using hardware, and the power management may be performed using firmware.

Representative Embodiments

In some embodiments, an access point includes: one or more nodes configured to communicatively couple to an antenna; and an interface circuit, communicatively coupled to the one or more nodes, configured to communicate with an electronic device in a wireless local area network (WLAN), and configured to cause the access point to: (i) establish one or more target wakeup times (TWTs) with the electronic device; (ii) transition to a power-saving mode outside of the one or more TWTs; and (iii) maintain synchronization with the electronic device, during at least a first TWT of the one or more TWTs, by performing one or more of: (iv) transmitting, to the electronic device, a TWT beacon including (or in conjunction with) synchronization information, or (v) transmitting a multi-user trigger frame including the synchronization information to the electronic device, receiving one or more data frames from the electronic device in response to the multi-user trigger frame, and transmitting an acknowledgment to the electronic device.

In some embodiments, the interface circuit is further configured to cause the access point to transition, after transmitting the acknowledgement, into the power-saving mode during a remainder of at least the first TWT after transmitting the acknowledgment. In some embodiments, the access point includes a software-enabled access point. In some embodiments, the synchronization information in the multi-user trigger frame or the TWT beacon includes one or more of: a timestamp field, or change information associated with communication between the access point and the electronic device. In some embodiments, the TWT beacon is transmitted at a beginning of the at least first TWT. In some embodiments, the interface circuit is further configured to cause the access point to, at a beacon-transmission time outside of the one or more TWTs: transition to a higher-power operating mode and transmit a beacon including (or in conjunction with) change information associated with communication between the access point and the electronic device; and transition back to the power-saving mode after transmitting the beacon. In some embodiments, during a given TWT in the one or more TWTs, the access point has a higher priority to access a channel than the electronic device. In some embodiments, the interface circuit is further configured to cause the access point to, after transmitting the acknowledgment and before an end of at least the first TWT, transition to the power-saving mode when the electronic device indicates, in a last one of the data frames, that it is transitioning to a second power-saving mode. In some embodiments, the interface circuit is further configured to cause the access point to transmit multicast/broadcast information after transmitting the TWT beacon during at least the first TWT. In some embodiments the interface circuit is further configured to cause the access point to skip transmitting TWT beacons during at least one of the one or more TWTs. In some embodiments, the access point further includes the antenna.

In some embodiments, a non-transitory computer-readable storage medium stores instructions that, when executed by an interface circuit included in an access point, causes the access point to selectively transition to a power-saving mode, by carrying out one or more operations that include: (i) establishing one or more target wakeup times (TWTs) with an electronic device; (ii) transitioning to the power-saving mode outside of the one or more TWTs; and (iii) maintaining synchronization with the electronic device, during at least a first TWT of the one or more TWTs, by performing one or more of: (iv) transmitting, to the electronic device, a TWT beacon including (or in conjunction with) synchronization information; or transmitting a multi-user trigger frame comprising the synchronization information to the electronic device, receiving one or more data frames from the electronic device in response to the multi-user trigger frame, and transmitting an acknowledgment to the electronic device, wherein the access point includes a software-enabled access point.

In some embodiments, execution of the instructions further causes the access point to transition, after transmitting the acknowledgement, into the power-saving mode during a remainder of at least the first TWT. In some embodiments, the synchronization information in the multi-user trigger frame or the TWT beacon includes one or more of: a timestamp field, or change information associated with communication between the access point and the electronic device. In some embodiments, the TWT beacon is transmitted at a beginning of at least the first TWT. In some embodiments, execution of the instructions further causes the access point to, at a beacon-transmission time outside of the one or more TWTs: transition to a higher-power operating mode and transmit a beacon including (or in conjunction with) change information associated with communication between the access point and the electronic device; and transition back to the power-saving mode after transmitting the beacon. In some embodiments, during a given TWT in the one or more TWTs, the access point has a higher priority to access a channel than the electronic device. In some embodiments, execution of the instructions further causes the access point to transition, after transmitting the acknowledgment and before an end of at least the first TWT, to the power-saving mode when the electronic device indicates, in a last one of the data frames, that it is transitioning to a second power-saving mode. In some embodiments, execution of the instructions further causes the access point to transmit multicast/broadcast information after transmitting the TWT beacon during at least the first TWT.

In some embodiments, a method for selectively transitioning to a power-saving mode, the method includes, using an interface circuit in an access point: (i) establishing one or more target wakeup times (TWTs) with an electronic device; (ii) transitioning to the power-saving mode outside of the one or more TWTs; (iii) and maintaining synchronization with the electronic device, during at least a first TWT in the one or more TWTs, by performing one or more of: transmitting, to the electronic device, a TWT beacon comprising (or in conjunction with) synchronization information; or transmitting a multi-user trigger frame comprising the synchronization information to the electronic device, receiving data frames from the electronic device in response to the multi-user trigger frame, and transmitting an acknowledgment to the electronic device.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
   one or more nodes configured to communicatively couple to an antenna; and
   an interface circuit, communicatively coupled to the one or more nodes, configured to communicate with an electronic device in a wireless local area network (WLAN), and configured to cause the access point to:
      establish one or more target wakeup times (TWTs) with the electronic device;
      transition to a power-saving mode outside of the one or more TWTs; and
      maintain synchronization with the electronic device by transmitting to the electronic device, during at least a first TWT of the one or more TWTs a TWT beacon comprising synchronization information; and/or
      a multi-user trigger frame comprising the synchronization information;
      wherein at a regular, non-TWT beacon-transmission time outside of the one or more TWTs established with the electronic device, the interface circuit is further configured to cause the access point to:
         transition to a higher-power operating mode and transmit a regular, non-TWT beacon comprising change information associated with communication between the access point and the electronic device; and
         transition back to the power-saving mode after transmitting the regular, non-TWT beacon,
      wherein the synchronization information comprises i) an indication to the electronic device of the change information, and ii) a next regular, non-TWT beacon transmission time.

2. The access point of claim 1, wherein the interface circuit is further configured to cause the access point to:
   receive one or more data frames from the electronic device in response to the multi-user trigger frame;
   transmit an acknowledgment to the electronic device responsive to receipt of the one or more data frames; and
   transition, after transmitting the acknowledgement, into the power-saving mode during a remainder of at least the first TWT after transmitting the acknowledgment.

3. The access point of claim 1, wherein the synchronization information in the multi-user trigger frame or the TWT beacon includes: a timestamp field and and an updated beacon change sequence value indicating the change information associated with communication between the access point and the electronic device.

4. The access point of claim 1, wherein the TWT beacon is transmitted at a beginning of the at least first TWT.

5. The access point of claim 1, wherein during a given TWT in the one or more TWTs, the access point has a higher priority to access a channel than the electronic device.

6. The access point of claim 1, wherein, the interface circuit is further configured to cause the access point to:
   receive one or more data frames from the electronic device in response to the multi-user trigger frame;
   transmit an acknowledgment to the electronic device responsive to receipt of the one or more data frames; and
   transition to the power-saving mode when the electronic device indicates, in a last one of the one or more data frames, that the electronic device is transitioning to a second power-saving mode.

7. The access point of claim 1, wherein, after transmitting the TWT beacon during at least the first TWT, the interface circuit is further configured to cause the access point to transmit multicast/broadcast information.

8. The access point of claim 1, wherein the interface circuit is further configured to cause the access point to skip transmitting TWT beacons during at least one of the one or more TWTs.

9. The access point of claim 1, wherein the change information comprises information specifying a channel used for communication between the access point and the electronic device.

10. The access point of claim 1, wherein transitioning the access point to the higher-power operating mode at the regular, non-TWT beacon-transmission time outside of the one or more TWTs occurs in absence of receiving a probe from the electronic device.

11. A non-transitory computer-readable storage medium storing instructions that, when executed by an interface circuit included in an access point, causes the access point to selectively transition to a power-saving mode, by carrying out one or more operations that comprise:
  establishing one or more target wakeup times (TWTs) with an electronic device;
  transitioning to the power-saving mode outside of the one or more TWTs; and
  maintaining synchronization with the electronic device by transmitting to the electronic device, during at least a first TWT of the one or more TWTs a TWT beacon comprising synchronization information; and/or
  a multi-user trigger frame comprising the synchronization information;
  wherein execution of the instructions further causes the access point to:
  at a regular, non-TWT beacon-transmission time outside of the one or more TWTs established with the electronic device:
    transition to a higher-power operating mode and transmit a regular, non-TWT beacon comprising change information associated with communication between the access point and the electronic device; and
    transition back to the power-saving mode after transmitting the regular, non-TWT beacon,
    wherein the synchronization information comprises i) an indication to the electronic device of the change information, and ii) a next regular, non-TWT beacon transmission time.

12. The non-transitory computer-readable storage medium of claim 11, wherein execution of the instructions further causes the access point to:
  receive one or more data frames from the electronic device in response to the multi-user trigger frame;
  transmit an acknowledgment to the electronic device responsive to receipt of the one or more data frames; and
  transition into the power-saving mode during a remainder of at least the first TWT, after transmitting the acknowledgement.

13. The non-transitory computer-readable storage medium of claim 11, wherein the synchronization information in the multi-user trigger frame or the TWT beacon includes: a timestamp field and and an updated beacon change sequence value indicating the change information associated with communication between the access point and the electronic device.

14. The non-transitory computer-readable storage medium of claim 11, wherein the TWT beacon is transmitted at a beginning of at least the first TWT.

15. The non-transitory computer-readable storage medium of claim 11, wherein during a given TWT in the one or more TWTs, the access point has a higher priority to access a channel than the electronic device.

16. The non-transitory computer-readable storage medium of claim 11, wherein execution of the instructions further causes the access point to:
  receive one or more data frames from the electronic device in response to the multi-user trigger frame;
  transmit an acknowledgment to the electronic device responsive to receipt of the one or more data frames; and
  transition, after transmitting the acknowledgment and before an end of at least the first TWT, to the power-saving mode when the electronic device indicates, in a last one of the one or more data frames, that the electronic device is transitioning to a second power-saving mode.

17. The non-transitory computer-readable storage medium of claim 11, wherein execution of the instructions further causes the access point to transmit multicast/broadcast information after transmitting the TWT beacon during at least the first TWT.

18. The non-transitory computer-readable storage medium of claim 11, wherein the change information comprises information specifying a channel used for communication between the access point and the electronic device.

19. A method for selectively transitioning to a power-saving mode, the method comprising:
  using an interface circuit in an access point:
    establishing one or more target wakeup times (TWTs) with an electronic device;
    transitioning to the power-saving mode outside of the one or more TWTs;
    maintaining synchronization with the electronic device by transmitting to the electronic device, during at least a first TWT in the one or more TWTs:
      a TWT beacon comprising synchronization information; and/or
      a multi-user trigger frame comprising the synchronization information; and
    at a regular, non-TWT beacon-transmission time outside of the one or more TWTs established with the electronic device:
      transitioning to a higher-power operating mode and transmitting a regular, non-TWT beacon comprising change information associated with communication between the access point and the electronic device; and
      transitioning back to the power-saving mode after transmitting the regular, non-TWT beacon,
      wherein the synchronization information comprises i) an indication to the electronic device of the change information, and ii) a next regular, non-TWT beacon transmission time.

20. The method of claim 19, wherein transitioning the access point to the higher-power operating mode at the regular, non-TWT beacon-transmission time outside of the one or more TWTs occurs in absence of receiving a probe from the electronic device.

* * * * *